April 4, 1967     J. B. GEHMAN     3,312,971

RADAR SYSTEM

Filed Sept. 30, 1964     4 Sheets-Sheet 1

JOHN B. GEHMAN,
INVENTOR.

By _(signature)_
ATTORNEY.

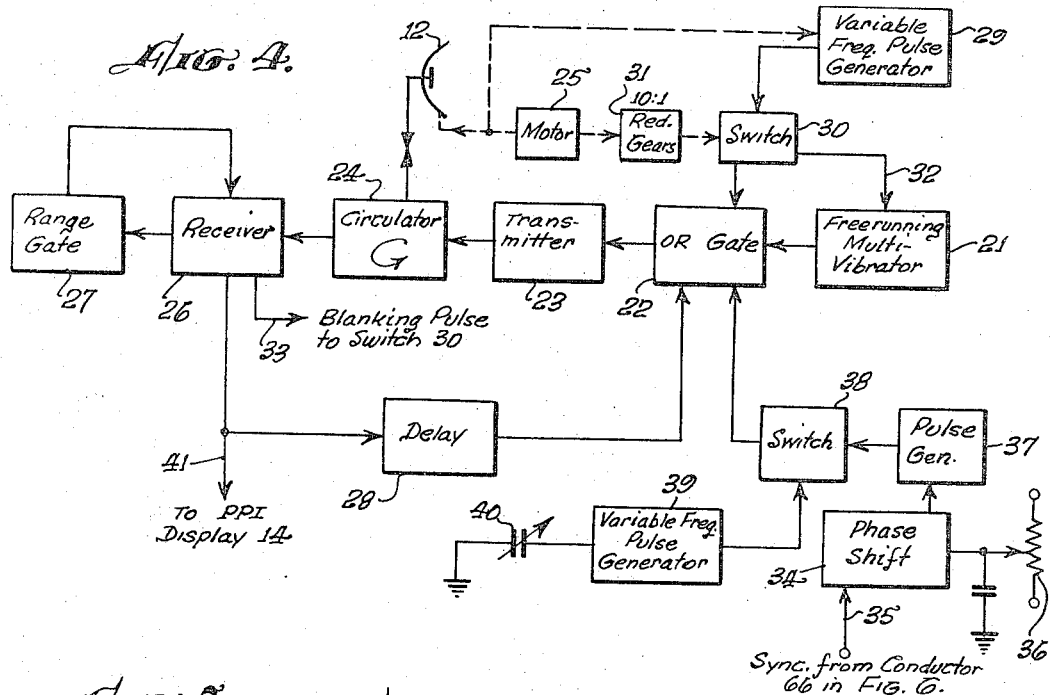
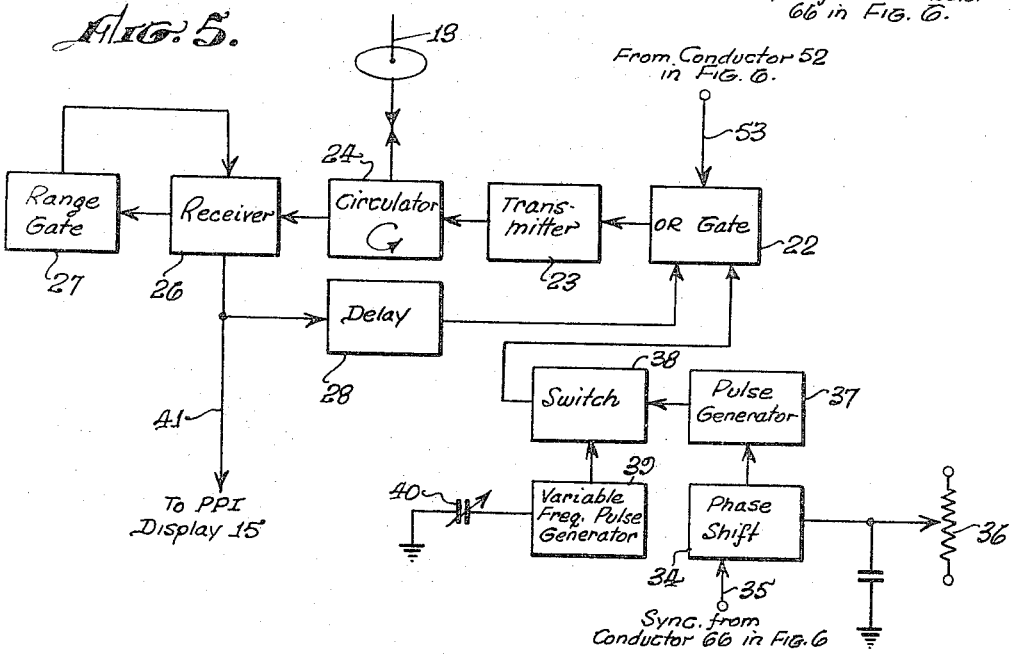

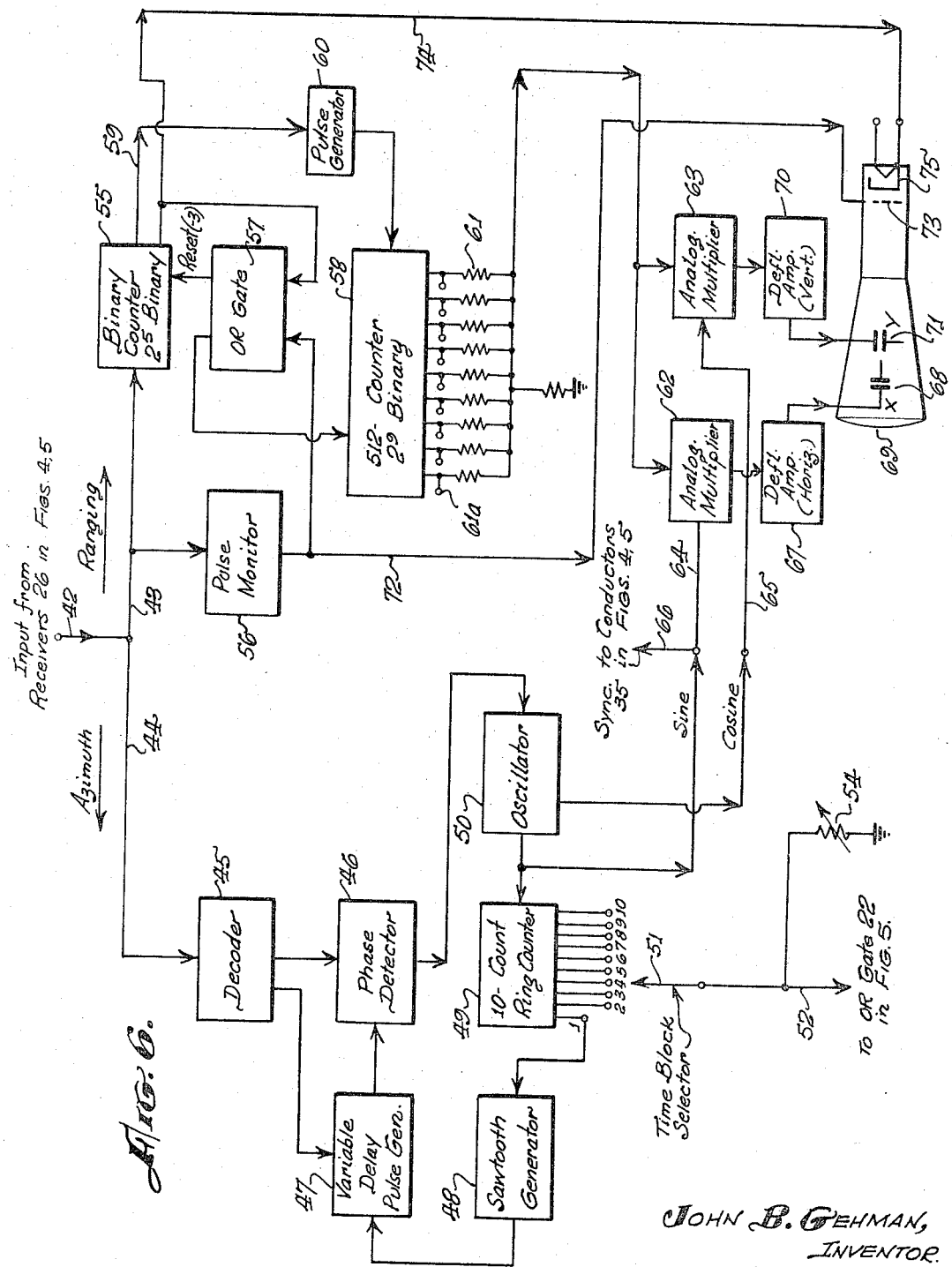

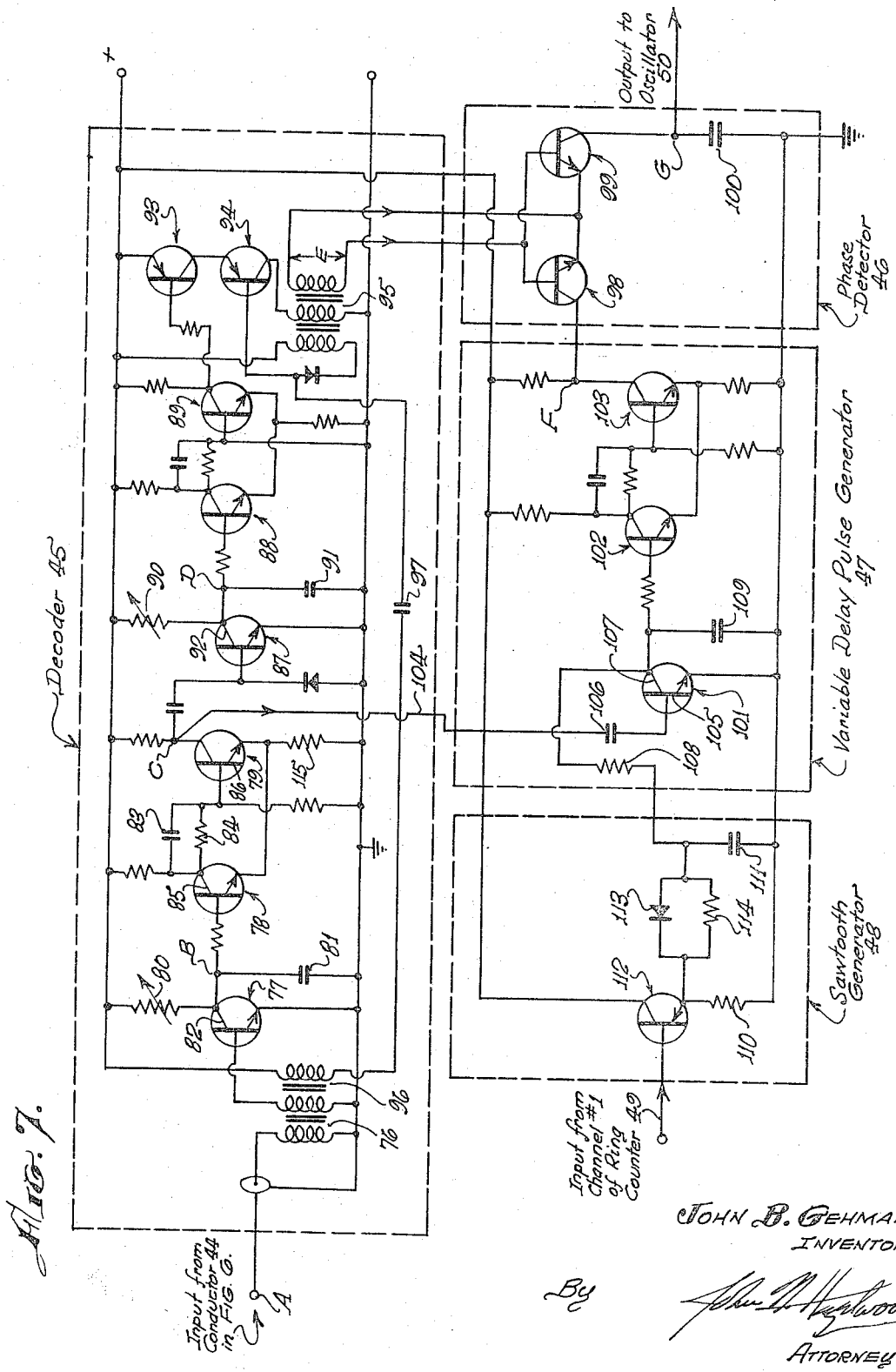

United States Patent Office 3,312,971
Patented Apr. 4, 1967

3,312,971
RADAR SYSTEM
John B. Gehman, La Jolla, Calif., assignor to General Dynamics Corporation, Pomona, Calif., a corporation of Delaware
Filed Sept. 30, 1964, Ser. No. 400,316
27 Claims. (Cl. 343—6.5)

This invention relates to radar systems, and more particularly, to a transponder radar system for use in positional control of aircraft and the like.

Formation flight has been determined necessary in order to reduce the vulnerability of individual aircraft and as a means to transport a maximum amount of material by an orderly grouping of aircraft in flight. It is essential to sense all aircraft in a flight group and to maintain an accounting of their position and changes in position. In order to maintain a formation and fly as a single aircraft, a pattern must be established relative to a leader or master aircraft. Since the flight time may be relatively long, an automatic system to control each aircraft in close formation is necessary to release strain on the pilot. Also, some flexibility is needed to make changes in the flight pattern. In order to mechanize these requirements, the type of sensor utilized must be able to measure position regardless of weather conditions. Since any type of aircraft might be used, the formation flight equipment must be small and light. Simplicity and reliability are necessary to give the pilot full confidence in its operation. Formation flights vary considerably: some "in line" covering a range of 20 miles, others in simple V's, and V's on V's in which a few aircraft are close together and others are at a much greater distance. It is easy to have a spacing ratio greater than 1000 to 1, which, by itself, is difficult to portray by analog means. If leaders are involved in the formation, the nearest group usually fly on one leader using him as a focal point of a pattern. The leaders and their group form a pattern with each other over a much greater distance scale. There appears to be an optimum range at which a number of aircraft can be handled efficiently and simply without burdening the pilot with complicated equipment to cope with all situations. It is felt that the close-in range formation flight is the most critical, since it requires the most concentration from the pilot to react quickly and precisely.

The present invention, in its air-to-air mode, involves the use of radar transponders combined into a light weight, simplified and reliable system to mutually indicate range and azimuth of all cooperating aircraft flying in formation under all-weather conditions. The operational equipment in each aircraft is composed of two main units, a transponder and a display. The transponder unit generates pulse and radio frequency (RF) information which is radiated by an antenna system which is part of the transponder package. The display units in the other aircraft accept the signals from the transponder and process them to produce "blips" on the face of a cathode ray display tube, such as a Plan Position Indicator (PPI). Range is measured from the center of the display, and azimuth is measured around the periphery of the display. One aircraft, designated as the master, establishes control of all aircraft to be controlled within a flight group by initiating the interrogation, the timing sequence and the ranging signals for all the other aircraft, designated as slaves. The master sets up synchronizing signals and interrogates each slave in proper sequence by the use of time blocks and azimuth scan from a directional antenna. The slave's reply to the interrogation is processed to determine range and azimuth. Since the slave's reply is radiated from an omnidirectional antenna, the same information is provided to all other aircraft in the flight group on a "party line" basis. The processed information is displayed in all airrcaft on a PPI. Personal identification may be accomplished by push-button interruption of the transponded signal received from the slaves, allowing only the master and one's own "blip" to show.

Therefore, an object of this invention is to provide a radar system for air-to-air control of aircraft under all-weather conditions.

Another object of this invention is to provide a radar system for air-to-ground and ground-to-air operations involving aircraft under all-weather conditions.

It is a further object of this invention to provide a radar system for positional control of aircraft flying in formation under all-weather conditions.

Another object of this invention is to provide a radar system which utilizes a transponder unit and a display unit in each aircraft of a flight formation in order to establish and maintain positional control of all aircraft in the same formation.

Another object of this invention is to provide a radar system which provides range and azimuth data from each aircraft in a flight formation to all other aircraft in the same formation.

Another object of this invention is to provide a radar system which provides simulated or "artificial" vectoring responses, in selected azimuth and range, which function as directors for cooperating aircraft in a flight formation.

It is a further object of this invention to provide a radar system for positional control of cooperating aircraft in a flight formation wherein one aircraft, designated as the master, controls all other aircraft, designated as slaves.

It is a still further object of this invention to provide a radar system wherein a master control aircraft in a flight formation interrogates each aircraft in the formation to obtain position data, which in turn may be either monitored by analog or pictorial displays or, by digital methods, by all aircraft in the same formation.

Other objects and features of the invention, as well as the many advantages thereof, will be readily apparent to those skilled in the art from a consideration of the following written description and accompanying drawings wherein:

FIGURE 4 is a block diagram of the master transponder unit shown in FIG. 1;

FIGURE 5 is a block diagram of the slave transponder unit shown in FIG. 1;

FIGURE 6 is a block diagram of the display unit shown in FIG. 1; and

FIGURE 7 is a schematic circuit diagram of the azimuth synchronizing circuit in the circuit of FIGURE 6.

Figure 1:
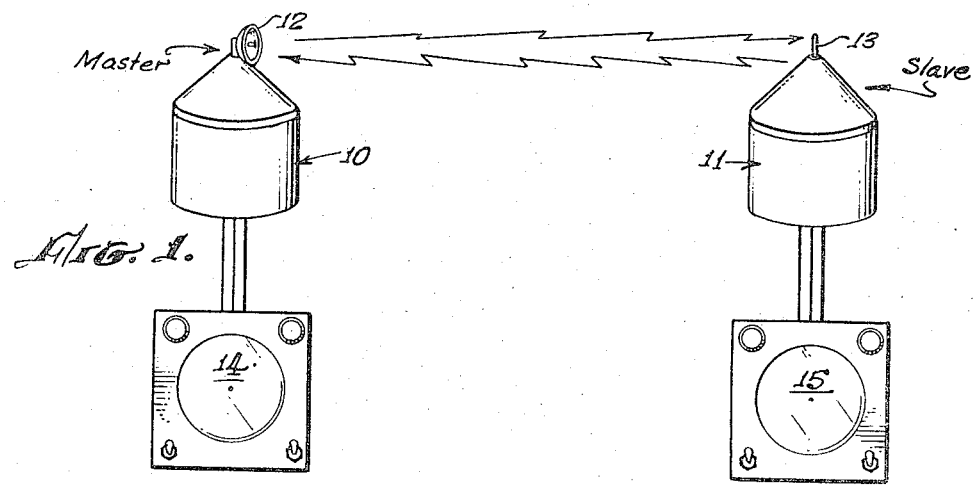
FIGURE 1 is a diagrammatic showing of the operational equipment in the aircraft in a controlled flight group according to the invention.
Figure 2:
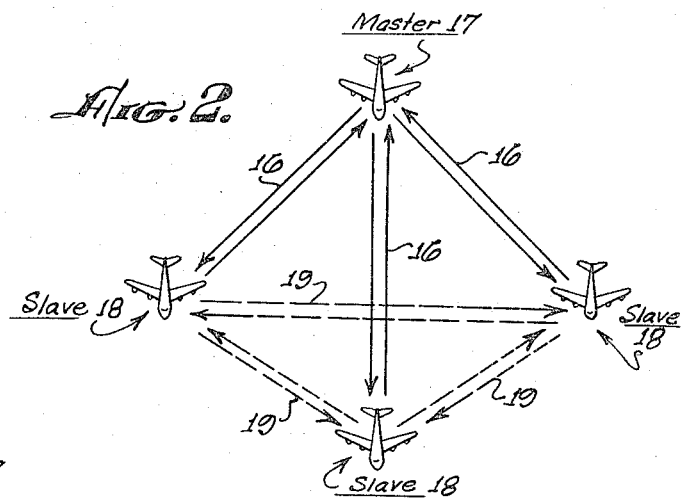
FIGURE 2 is a diagrammatic showing of the transmission paths established between the master aircraft and the slave aircraft within a controlled flight group.

Referring now to the drawings, and more particularly to FIG. 1, there is shown the operational equipment carried by the master aircraft and the slave aircraft in a controlled flight group. Master transponder unit 10 and slave transponder unit 11 communicate via directional antenna 12 and omnidirectional antenna 13, respectively. The particular antenna configurations shown are for purposes of illustration only, and it is well understood by those skilled in the art that other types and variations thereof may be substituted. Positional information received by the master is displayed on its PPI 14 and positional information received by a slave is displayed on similar PPI 15. FIGURE 2 shows a small group of aircraft flying in a typical formation and illustrates the direct transmission paths 16 established between master aircraft 17 and slave aircraft 18. Also shown in FIGURE 2 are the indirect "party line" monitoring paths 19 established between slave aircraft 18.

In the system of the present invention master aircraft 17 controls a number or slave aircraft 18, and all are operating at radar frequencies. The master 17 has its rotating directional antenna 12 scanning in a horizontal plane from which signals are emitted to indicate antenna azimuth and also to interrogate the slaves 18. The slaves each use an omnidirectional antenna 13 to receive the interrogations and to transmit replies in a wide elevation angle and through 360 degrees of azimuth. The slaves receive the master's interrogations only when they are within the master's antenna beam. Synchronizing circuitry, locked to the master's scanning antenna, within each slave, measures the phase delay of the interrogation cycle to determine the azimuth from the master's heading.

Normally, standard radar range is determined by directly displaying the elapsed time for an RF pulse to go to a target and return, with range being roughly 10 microseconds per round trip mile. Different measuring criteria are used in the present invention in order to provide range information to all slave aircraft, from each slave aircraft in respect to the master. The specific solution also provides a means for measuring minimum range and obtaining high resolution. The system requires the master aircraft 17 to initiate an RF interrogation pulse which is then repeated by a slave aircraft transponder. The master, also operating in a transponding mode, re-repeats the pulse which continues in a regenerative operation or in a "ring-around" fashion. The pulse repetition frequency (PRF) thus established is inversely proportional to distance:

$$PRF = \frac{1}{2t_r}$$

where $t_r$ is the propagation time to the transponder. Thus, a 1-mile range would establish a PRF of 100 kilocycles (kc.). The system as described, unless modified, would be subject to a limited minimum range and would be sensitive to noise. At short range the PRF would become very high and, in fact, approach a point of overlapping transmitted and received pulses. As an example, a ¼ microsecond pulse would overlap at 125 feet due to a PRF of 4 megacycles (mc.). In addition, if the system should has a noise pulse injected into the chain, it too will be circulated. The PRF is multiplied one unit for each noise pulse, thus the noise would be integrated. In order to eliminate this condition, an active delay ($t_d$), equal to the maximum propagation time of the designed range, has been added to each transponder. The pulse output from the receiver in each transponder is gated before delay and re-transmission, so that all signals are blanked after a received pulse for twice the internal delay time (2 $t_d$). The effect of delay and gating is to limit the range of PRF to two-to-one, where multiple pulses may not exist. If a noise pulse is admitted, it will be circulated as a signal causing only a shift in phase, but having the same PRF. The following relation now gives PRF:

$$PRF = \frac{1}{2t_r + 2t_d}$$

where $t_d = t_r$ maximum. For zero propagation delay, it can also be seen that PRF is equal to $1/2t_d$ and at maximum design range the PRF is $1/4t_d$.

Radar frequencies were selected as the sensor means since they have the best combination of weather penetration, energy, range accuracy and angular determination. The transponder arrangement selected achieves a high-level transmission at a low power input. The system therefore has a high signal-to-noise ratio and a greater range accuracy. Measurement is made to the antenna only, rather than reflections from miscellaneous metal parts which scintillate and are constantly in motion. Single frequency operation was desired to simplify component design and to reduce frequency clutter. The need for all aircraft in a master-slave formation not only to position themselves but also to know where everyone else is, requires a special technique. The party-line technique of the present invention was conceived whereby range is measured by repetition rate, and azimuth by synchronous time measurements from a reference heading. This allows any receiving location to decipher required range and azimuth without an additional telemeter link.

Figure 3:
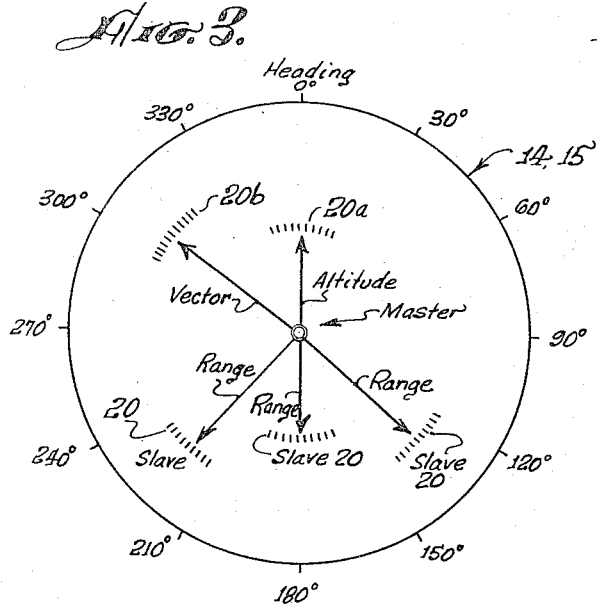
FIGURE 3 is a diagrammatic showing of the cathode ray tube or PPI display in each aircraft.

The display on the PPI in each aircraft in a flight group has common coordinates, with the master at the center, as shown in FIGURE 3. The slaves can move about the center and position themselves in a planned formation on this map-like presentation. The PPI display is the result of a computation—not direct video from a radar output. This is accomplished by a counting technique combining both digital and analog circuitry which retains accurate and continuous indexing. The signals received from a transmitting transponder by all members in the formation are range gated, verified and averaged to produce a noise-free and non-speckled picture. Individual "blips" on the PPI displays 14, 15 indicate range and azimuth through an interrogation cycle, resulting in a "cusp" 20 covering 10 to 15 degrees of arc length about the center. Simulated or "artificial" responses may also be added to the displays to provide additional information such as altitude 20a or a vector 20b, as shown in FIGURE 3.

In many flight formations, aircraft will find themselves within the same interrogating sector of the master's directional beam and would normally make nearly simultaneous replies. By incorporating a counting gate between the receiver and the transmitter in each slave, a sequential time block is established which allows individual responses to interrogations. The counting gate is synchronized to the antenna scan so that each scan is reserved for a separate slave aircraft. By having a 10-count time block, by way of example, and reserving number one for the master synchronizing pulse burst, nine slave aircraft may be handled. With the master antenna scan speed set at 600 r.p.m. (10 r.p.s.), for example, complete interrogation of all aircraft will be accomplished in one second.

Referring now to FIGURES 4 and 5, there are shown similar block diagrams of master transponder unit 10 and slave transponder unit 11, respectively. With the exception of range and azimuth initiating circuits, and antenna drive-switch means, which form a necessary part of master transponder 10, the master and slave transponders are alike. Therefore, it will be understood that like circuit functions in FIGURES 4 and 5 operate in a like manner. If so desired, all aircraft in a controlled flight formation may carry the same operational equipment as a master, thus making masters, and slaves interchangeable for tactical reasons.

In FIGURE 4, range initiation signals are generated by an astable or free-running multivibrator 21 which may be operating at 1200 p.p.s., for example. After passing though an OR gate 22, a transmitter 23 and a circulator 24, the range initiation signals are radiated by scanning directional antenna 12 to the slaves. Directional antenna 12, rotating at 600 r.p.m. in the particular design chosen, is driven by a motor 25. A slave thus interrogated transmits replies from its omnidirectional antenna 13 back to the master's directional antenna 12 where the received signals are directed by circulator 24 into a receiver 26. A range gate 27 operates to close down receiver 26 for a very short time, 10 microseconds in the present instance for a one mile system. In effect, range gate 27 prevents reptetion of signals less than 10 microseconds apart from being admitted to the P.P.I. display circuitry, following initial reception. Receiver 26 feeds the gated incoming signals to a fixed-delay circuit 28 and thence to OR gate 22. The output from OR gate 22 is applied to transmitter 23 in the master, as before, and after passing through circulator 24, is re-transmitted from scanning directional antenna 12 to the slave once more. The received signal back from the slave again recycles and a pulse repetition rate is established in a ring-around fashion from master to slave. The ring-around frequency is a function of the distance and the delays in both systems.

In master transponder 10, azimuth signals are generated by a variable frequency pulse generator 29, which may be a type of voltage-controlled relaxation oscillator, operating from 5 kc. to 10 kc. The azimuth signals are applied to OR gate 22 through a switch 30, where they pass through transmitter 23 and circulator 24 to master antenna 12. The characteristics of this system are such that as antenna 12 rotates, variable frequency pulse generator 29 varies proportionally 2:1 in frequency. In the system design being described, variable frequency pulse generator 29 is varied from 5 kc. to 10 kc., starting with zero degrees azimuth and increasing up to 359 degrees plus, at which time generator 29 recycles and varies from 5 kc. to 10 kc. again. Transmission of azimuth signals are reserved for one out of ten rotations of scanning antenna 12. For instance, as antenna 12 scans for 10 revolutions, the first rotation may be reserved for transmitting azimuth signals. This may be accomplished, for example, by a mechanical connection to rotating antenna 12 or by utilizing synchronizing signals from master P.P.I. display unit 14. In the present design, a mechanical connection to antenna 12 is preferred and comprises a 10:1 reduction gear train 31 driven by motor 25 to actuate switch 30, which may be a conventional commutator switch, for example. In addition to switching azimuth signals into OR gate 22, switch 30 also functions to apply an inhibiting or blanking pulse to free-running multivibrator 21 through a conductor 32. The inhibiting or blanking pulse is applied from switch 30 through a conductor 33 to receiver 26. Thus, free-running multivibrator 21 and the receiver 26 is inhibited or blanked out at prescribed intervals and is prevented from interfering with the azimuth signals coming from variable frequency pulse generator 29, and from the received signal, once established.

Command vector signals, which are transmitted as part of the system from master or slave aircraft, are displayed an "artificial" blips, 20a and 20b, on the PPI displays, as shown in FIGURE 3. The signals are injected into the azimuth scan in proper time intervals and PRF, depending upon the particular azimuth angle that one wishes to depict, and appear as part of the PPI display at the proper azimuth and range. A 10-cycle per second synchronizing signal, obtained from display units 14 or 15, is fed into a phase shifter 34 through a conductor 35 in FIGURES 4 or 5 to shift the azimuth signal 10 cycles over 360 degrees. Phase shifter 34 is manually adjusted by a potentiometer 36. The output of phase shifter 34 triggers a pulse generator 37, which may be a type of monostable multivibrator. The pulse from pulse generator 37 turns on a switch 38 which allows a variable frequency pulse generator 39 to apply short burst signals, 50 kc. to 100 kc. for a one mile system, for example, through switch 38 to OR gate 22 and thence out to the antennas where they are radiated. Switch 38 may be any of the conventional transistor switches in use. Variable frequency pulse generator 39, which may be an astable multivibrator, is manually adjusted by a variable capacitor 40. The signals thus produced may be utilized in a number of ways. For example, they may be used as altitude markers, in which the frequency range could be from zero to 5,000 feet in the case of a one mile system. Or targets could be located out to one mile from the other aircraft in a flight formation. The signals could also be used to direct a slave to a new position in the flight formation, or to give commands for right or left turns. Additional control could be incorporated with the vectors to provide a flashing on-off code at predetermined rates on the PPI displays which would give tactical commands without use of voice communication.

A ring-around system can be very sensitive to noise pulses and other types of interference and will result in generation and recirculation of more than one pulse, where only a single pulse should be present. The spurious repetition rates or harmonics will represent fractions of the distances that are actually being measured. For instance, if twice the operating frequency were so generated, a measurement of one-half the actual distance would result. The foregoing effect has been effectually minimized by range gate 27 and delay circuit 28. In order that the 2:1 range in frequency, that is, the 50 kc. to 100 kc. range, is maintained, the delay 28 in both master and slave is set up to be equal and equivalent to the propagation delay of the maximum range. If it is established that 5 microseconds, the propagation time for approximately one mile, is the maximum range, then the delay time in each unit is 5 microseconds. Therefore, when the antennas are at zero range, and with propagation delay at 5 microseconds and the internal systems set at 5 microseconds, the total time around would be 10 microseconds delay, internally to each system. At a one mile range, the total time delay is 10 microseconds plus 10 microseconds, or 20 microseconds. The repetition rate established under these particular conditions would be 100 kc. for zero range and 50 kc. for a one mile range. Stations outside the one mile range would be blanked out by a monitor blanker in the PPI display circuitry 14, 15 to be described more fully hereinafter. The monitor blanker detects all ranges greater than 20 microseconds and deletes them from the PPI display. A longer range system would also follow the rule that the total delay for maximum range is the time of propagation of the maximum range. For example, in a two mile system there would be a delay of 10 microseconds in delay circuits 28, and the pulse repetition frequency would be 50 kc. to 25 kc., thus maintaining the 2:1 range in frequency.

The output from receiver 26 in FIGURES 4 and 5 is conducted from an output conductor 41 to input conductors 42, 43 and 44 of PPI display units 14, 15, as shown in FIGURE 6. In the system being described, by way of example, the range signals are bursts at a frequency range of 50 kc. to 100 kc. The bursts represent replies to interrogations. The azimuth signal pulses, pulsing at a 5 kc. to 10 kc. rate, are produced during the first scan of rotating directional antenna 12. A decoder circuit 45 is designed to accept azimuth signal only, eliminating the higher frequency range signals. Decoder circuit 45 is provided with two outputs, one to a phase detector 46, and the other to a variable delay pulse generator 47, having the characteristics of a monostable multivibrator, which delays incoming pulses from 100 to 200 microseconds, for example. Variable delay pulse generator 47, having an output to phase detector 46, is controlled by a sawtooth generator 48 which is operating from a ten-count ring counter 49 connected to a voltage-controlled 10 c.p.s. oscillator 50. The output of phase detector 46 is applied to oscillator 50. An output from the phase detector 46, either plus or minus, will control the 10 c.p.s. oscillator 50 either to speed it up or to slow it down. Ten-count ring counter 49 is utilized so that only one scan in ten operates during azimuth synchronization. Therefore, for one-tenth of a second, every 10 cycles, or for one cycle, a pulse of one-tenth of a second duration will be fed into sawtooth generator 48. As will be discussed more fully hereinafter in connection with FIG. 7, the output voltage from sawtooth generator 48 causes variable delay pulse generator 47 to scan from 100 to 200 microseconds delay which delays the output pulse from the decoder 45 which is arriving via line 104 (see FIG. 7) so as to provide the incoming pulses to phase detector 46. The 10 c.p.s. oscillator 50 tries to anticipate the position of the rotating directional antenna 12 so that it may synchronize with the antenna. When the oscillator 50 is synchronized, each pulse from the decoder 45 will be coincident with the pulse which preceded it, as that preceding pulse is provided by the delay generator 48. If it is in error, a voltage will be received from phase detector 46, the phase and polarity of which will correct oscillator 50 in the proper direction.

Slave stations select any of the time blocks from 2 to 10 of ten-count ring counter 49 by using a manual time block selector 51. The first time block or channel is reserved for azimuth synchronization. The output from the time block selected by manual selector 51 will be conducted by a conductor 52 to conductor 53 leading to OR gate 22 of the slave transponder unit shown in FIGURE 5. The selected output is used by the slave to inhibit or blank out its own transmission except while being interrogated by the master. A slave makes replies only during the time block reserved for its use. A potentiometer 54, connected to conductor 52 in FIGURE 6, is used for controlling gain in order that there may be some signal discrimination. This feature is necessary so that, at close range, the signal coming in will not interrogate for 360 degrees, but only during that time when the slave is in the main lobe of the directional pattern transmitted from rotating directional antenna 12. It is not anticipated that potentiometer 54 will be continually adjusted during a flight formation, but, rather, that it will be adjusted when approaching either for a landing or for a rendezous. Adjustment of potentiometer 54 would be necessary due to changes of signal strength caused by changing distances. Automatic gain control, essentially based on known range and signal strength, would be most appropriate.

Range signals of 50 kc. to 100 kc. are conducted by conductors 42, 43 in FIGURE 6 to a 32-count binary counter 55 and also to a pulse monitor circuit 56. An OR gate 57 is connected to binary counter 55, pulse monitor circuit 56 and to another binary counter, 512-counter 58. An output lead 59 of counter 55 is connected to a pulse generator 60, operating at 3.2 mc. The output of pulse generator 60 is applied to counter 58. An analog output circuit 61, connected to the output of counter 58, applies the counter 58 output to a pair of analog multiplier circuits 62 and 63. A digital output circuit 61a of counter 58 is also available, if desired. Also feeding into analog multipliers 62, 63 are the sine and cosine signal functions from oscillator 50 along conductors 64 and 65, respectively. A branch conductor 66 connected to conductor 64 applies the 10-cycle synchronizing signal to phase shifter 34 in FIGURES 4, 5 via conductor 35 to provide vector signals, as previously discussed. In FIGURE 6, the output from analog multiplier 62 is fed to a horizontal deflection amplifier 67 which amplifiers the voltages applied to a set of horizontal or X-axis deflection plates 68 in a cathode ray tube 69. The output from analog multiplier 63 is fed to a vertical deflection amplifier 70 which amplifies the voltages applied to a set of vertical or Y-axis deflection plates 71 in cathode ray tube 69. A conductor 72 connects pulse monitor 56 to a grid 73 of cathode ray tube 69 to blank signals detected by the monitor and a conductor 74 connects counter 55 to the cathode 75 of cathode ray tube 69 to intensify signals admitted by the system.

In operation, the series of 50 to 100 kc. range signals, coming in along conductor 43, cause a count in 32-count binary counter 55 to set up a 16 count pulse gate. The final stage of counter 55, a flip-flop (not shown), is 50% on and 50% off during the count, that is, it goes on for 16 counts and goes off for 16 counts. Since counter 55 in the present design is set to minus 3, it requires 3 trial pulses to first initiate the gate to a positive condition. This positive condition activates 3.2 mc. pulse generator 60 which stays on for 16 pulses and allows the pulse generator 60 to be counted in the larger counter 58 which is a 512 register for a one mile range. Counter 55 determines the length of the gate used to produce pulses counted by counter 58. The total number of counts accumulated from the pulse generator 60 yields a voltage proportional to range in the form of a staircase voltage having a maximum of 512 levels from the counter 58. At the end of the 16 pulse period, the gate closes. Rather than wait for 16 pulses to go by before the gate opens again, the counter 55 is recycled to minus 3 via OR gate 57 which also admits signals from pulse monitor circuit 56. Pulse monitor 56, which is a 20 microsecond monitor blanker, checks signals coming in along conductor 43 to verify that no signal has a time period greater than 20 microseconds, thereby eliminating all signals into counter 55 which are spaced greater than 20 microseconds apart. If signals spaced greater than 20 microseconds apart are detected in pulse monitor 56, a reset pulse is applied to OR gate 57 to reset counter 55 to minus 3, and to also reset counter 58 to zero. At the same time the counters are being reset, the output from pulse monitor 56 is also fed along conductor 72 to grid 73 of cathode ray tube 69 to be certain that the cathode ray tube does not display the erroneous count or signal. If a correct signal has been received, the output from counter 55 is carried by conductor 74 to provide an intensity signal to cathode 75 of cathode ray tube 69 in order to increase the intensity of the display at the time required. The output from analog output circuit 61 is multiplied in analog multipler 62, simultaneously with the sine function from the 10 c.p.s. oscillator 50. The horizontal deflection amplifier 67 amplifies the output from analog multiplier 62 and applies it to the horizontal deflection plates 68 of cathode ray tube 69, deflecting the cathode ray tube display along the horizontal or X-axis. Similarly, the output from analog output 61 is multiplied in analog multipler 63, simultaneously with the cosine function from the 10 c.p.s. oscillator 50. The vertical deflection amplifier 70 amplifies the output from analog multiplier 63 and applies it to the vertical deflection plates 71 of cathode ray tube 69, deflecting the cathode ray tube display along the vertical or Y-axis.

Referring now to FIGURE 7, there is shown a schematic circuit diagram of the azimuth synchronizing circuit in FIGURE 6, which includes decoder circuit 45, phase detector 46, variable delay pulse generator 47 and sawtooth generator 48. In decoder circuit 45, incoming signals are received at a point A and are fed to a transformer 76 coupled to a first "trigger-anytime multivibrator" which is a different form of monostable multivibrator. A monostable multivibrator is a multivibrator with one stable state and one unstable state. A trigger signal is required to drive the unit into the unstable state, where it remains for a predetermined time before returning to its original stable state. The first "trigger-anytime multivibrator" includes three NPN transistors 77, 78 and 79, where transistors 78 and 79 combine to form a Schmitt trigger circuit. A Schmitt trigger is a regenerative bistable circuit whose state depends on the amplitude of its input voltage. A variable resistor 80 is connected to a source of positive voltage (not shown) and is jointly connected at a point B with a capacitor 81 to the collector 82 of transistor 77 to form an adjustable RC time constant circuit. As capacitor 83 and a resistor 84, connected in parallel between Schmitt trigger transistors 78 and 79, are jointly connected to the collector 85 of transistor 78 and to the base 86 of transistor 79 to form a typical Schmitt trigger feedback circuit. The output of the first "trigger-anytime multivibrator" is connected at a point C to a second "trigger-anytime multivibrator" which includes three NPN transistors 87, 88 and 89, where transistors 88, 89 combine to form another Schmitt trigger circuit. A variable resistor 90 is connected to the positive voltage source and is jointly connected at a point D with a capacitor 91 to the collector 92 of transistor 87 to form another adjustable RC time constant circuit. The output of the second "trigger-anytime multivibrator" is connected to a blocking oscillator circuit which includes two PNP transistors 93, 94 and a transformer 95, with an output shown at E. A tertiary winding 96 of input transformer 76 is also connected to the blocking oscillator circuit through a capacitor 97. The output at E is applied to phase detector 46 which includes a pair of PNP transistors 98, 99 and a capacitor 100. The output of phase detector 46 is connected to the 10 c.p.s. voltage-controlled oscillator 50 at a point G. Another input to phase detector 46 is applied at a point F from the output of variable delay pulse generator 47. Variable delay pulse generator 47, which is a modified form of the aforementioned "trigger-anytime multivibrators," includes three NPN transistors 101, 102 and 103, where transistors 102 and 103 combine to form a Schmitt trigger circuit. A conductor 104 is connected to point C at the output of the first "trigger-anytime multivibrator" and conducts signals to the base 105 of transistor 101 through a coupling capacitor 106. The output of sawtooth generator 48 is connected to the collector 107 of transistor 101 through a resistor 108. A capacitor 109, jointly connected with resistor 108 to the collector 107 of transistor 101, combines with resistor 108 and with a resistor 110, a capacitor 111 and a PNP transistor 112 of sawtooth generator 48, to form a variable RC time constant network. A diode 113 and a resistor 114 are connected in parallel between resistor 110 and capacitor 111. Sawtooth generator 48 receives an input from channel 1 of ring counter 49.

In operation, the incoming signals which are repetitive at from 100 to 200 microsecond intervals (10 kc. to 5 kc.) are coupled from point A through transformer 76 to transistor 77 of the first "trigger-anytime multivibrator," which also includes transistors 78 and 79. Transistor 77 is generally in the off-state and a voltage from the positive voltage source 12 volts, for example, is applied across capacitor 81 through resistor 80 at point B. When activated by the input signal pulses, transistor 77 conducts and discharges capacitor 81 to ground potential, whereupon NPN transistor 78 in the Schmitt trigger is turned off. At an interval between pulses, capacitor 81 recharges within a certain time period, depending upon the time constant of resistor 80 and capacitor 81. At a predetermined positive voltage level, transistor 78 turns on the Schmitt trigger is turned on again. Conduction in transistor 78 causes a drop in voltage at NPN transistor 79, turning transistor 79 off and regeneratively coupling the voltage across a resistor 115 in the emitter circuit of the transistors back to transistor 78. The pulse coming in from point A causes the voltage at point B to lower, cutting off transistor 78 and regeneratively coupling it to transistor 79 to make transistor 79 turn on more surely. The "trigger-anytime multivibrator" circuit just described is used twice in decoder circuit 45 and once again, in modified form, whereby it becomes the variable delay pulse generator 47. Essentially, the "trigger-anytime multivibrator" circuit is a delay device, that is, an active delay device with a delay that is independent of the time in which a pulse arrives into the circuit.

The second "trigger-anytime multivibrator," which includes transistors 87, 88 and 89, is operated by the first "trigger-anytime multivibrator" from the output of the first multivibrator at point C. The second "trigger-anytime multivibrator" has the same fundamental time delay of 100 microseconds as that of the first "trigger-anytime multivibrator," and operates in essentially the same manner. The output from the second multivibrator sets up a gate in the blocking oscillator circuit, which includes transistors 93 and 94. The blocking oscillator will work only if there is a gain potential on transistor 93 which has been previously established by the second multivibrator. Also being applied to the blocking oscillator circuit are the input pulses from point A via tertiary winding 96 of input transformer 76 and capacitor 97 to transistor 94. The second "trigger-anytime multivibrator" is in its on-state between 100 and 200 microseconds, as initiated by the first multivibrator which was on between zero and 100 microseconds, as initiated by a first pulse from point A. A second pulse coming in at point A, following between 100 and 200 microseconds, will then fall within the gate established at transistor 93 and allow the blocking oscillator circuit to then be triggered. The output pulse developed at E in transformer 95 has been decoded and is now a proper pulse having a repetition rate, with pulse spacing, of between 100 and 200 microseconds. The output at E is applied to phase detector 46, which includes the two transistors 98 and 99 and the output point G across capacitor 100.

The output from channel 1 of the 10-count ring counter 49 is fed to transistor 112 which is the input component of the sawtooth generator 48. The ring counter 49, which is in synchronism with the rotating directional antenna, operates the azimuth scan channel once in 10 rotations. Preferably, the first rotation was selected for this operation. The output from channel 1 of the ring counter 49 is a square wave one-tenth second long 10 time blocks, each one-tenth of a second long, and since the counter counts to 10, the pulse period will be a total of one second duration. Transistor 112 in the sawtooth generator 48 operates only when it receives a signal from channel 1 of the ring counter. As transistor 112 operates, a linear sawtooth voltage is produced across capacitor 111. The diode 113 and resistor 114, connected in parallel, allow capacitor 111 to discharge quickly at the completion of the sawtooth wave. The sawtooth wave output across capacitor 111 is applied to input transistor 101 of the variable delay pulse generator 47, which also includes transistors 102 and 103. The output of the variable delay pulse generator appears at the output of transistor 103 at point F. As stated hereinbefore, variable delay pulse generator 47 is a modified form of the "trigger-anytime multivibrators" in decoder circuit 45, previously described. The modification is in the operation of input transistor 101 and the RC time constant circuit, resistor 108 and capacitor 109. In the first and second "trigger-anytime multivibrators," the RC time constants were controlled by resistor 80, capacitor 81 and by resistor 90, capacitor 91, respectively, with each RC circuit connected to the fixed pulse 12 volts. In the modified form, the time constant is controlled by capacitor 109 in combination with resistors 108, 114 and 110, and transistor 112; and in addition, depends upon a variable voltage which is impressed across capacitor 109. The variable voltage is generated by applying trigger pulses to the base input 105 of transistor 101 at timed intervals along the rising slope of the sawtooth wave which is coupled to the collector output 107 of transistor 101. The trigger pulses are applied through capacitor 106 to the base 105 of transistor 101 from point C at the output of the first "trigger-anytime multivibrator." The trigger pulse from C is delayed 100 microseconds and the delay of the pulse appearing at the output, point F, of the variable delay pulse generator 47 depends upon the portion of the sawtooth wave to which the trigger pulse was applied. The variation in time delay in the variable delay pulse generator is between zero and 100 microseconds. Therefore, the total delay at point F from an input at point A will be between 100 microseconds and 200 microseconds. The initial delay of 100 microseconds occurs at point C, and by adding this 100 to the zero minimum of the variable delay pulse generator, the minimum delay of 100 microseconds is derived. By adding the 100 microseconds from point C to the 100 maximum of the variable delay pulse generator, the maximum of 200-microseconds is derived. The voltage output at point F is applied to phase detector 46, which includes transistors 98 and 99 operating as a clamp circuit with an output at point G across capacitor 100. When the voltage output at E from decoder circuit 45 is applied to transistors 98 and 99, the transistors act as a switch to close the circuit. The voltage output from point F will then be conducted and applied to point G, across capacitor 100. If there is no signal from E the transistors 98, 99 are open and any voltage at F is not transferred to G. The normal state of transistor 103 at point F is the on-state and the voltage at F is less than that of the 12-volt supply source. Upon being triggered, transistor 103 opens and the full 12 volts appear at F. This voltage will return to the lower voltage at a time determined by the variable time constant controlled by the combination of capacitor 109, resistors 108, 114 and 110 and sawtooth generator transistor 112. If, for example, the voltage appearing at F during the normal state of transistor 103 is 6 volts, then when transistor 103 is triggered, the voltage will rise to 12 volts and return to 6 volts at the time determined by the variable time constant. If the output at E occurs sooner than anticipated, the phase detector 46 will clamp to the higher voltage of 12 volts at F, and capacitor 100 will be charged to 12 volts. If the output at E happens to occur later, the phase detector will clamp to the lower voltage of 6 volts. In the present system, there is a voltage between 6 and 12 volts, 9 volts for example, which satisfies the conditions for synchronizing the system. This voltage, appearing at G, is applied to the 10 c.p.s. oscillator 50, and depending upon the spacing of the pulses, will either increase or decrease the frequency of oscillation, to maintain synchronization of the system.

While the invention has been described and shown as relating to positional control of aircraft while flying in formation, it is not intended to be limited thereto, and may be utilized to provide information to aircraft and the like for takeoff, landing and inflight rendezvous operations.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A radar system for indicating the position of aircraft in a flight formation which includes a master aircraft and at least one slave aircraft, said radar system comprising a plurality of transponders, one of said transponders being located on each of said aircraft; each of said transponders including a transmitter and a receiver tunable to the same carrier frequency common to all transponders; each of said transponders also including an antenna operably connected to said transmitter and to said receiver; first pulse generating means operably connected in the transponder of at least said master aircraft to provide range signals for interrogating said slave aircraft; gate circuit means in each of said transponders operably connected to a first output of the associated receiver and responsive to replies to said interrogating signals for providing repetitive gated range reply signals in a range of prescribed intervals of time; delay circuit means in each of said transponders operably connected between a second output of the associated receiver and said transmitter for delaying said gated range reply signals for prescribed intervals of time; second pulse generating means operably connected in the transponder of at least said master aircraft to the transmitter thereof for providing azimuth signals which are functions of different sectors of azimuth about said master aircraft, to said slave aircraft; and display means in each aircraft including azimuth synchronizing circuit means, responsive to said azimuth signals and said range signals operably connected to said transponders of said slave aircraft, for (a) enabling said transmitters of said slave aircraft to transmit received reply signals when said slaves are in preselected ones of said azimuth sectors and (b) providing range and azimuth positional indications of said slave aircraft with respect to said master aircraft.

2. The radar system defined in claim 1, wherein said antenna for said master aircraft comprises a rotatable directional antenna adapted to be driven in rotation.

3. The radar system defined in claim 1, wherein said antenna for said slave aircraft comprises an omni-directional antenna.

4. The radar system defined in claim 1, wherein said display means additionally includes counter circuit means responsive to said range signals for computing said range indication.

5. The radar system defined in claim 1, wherein said display means additionally includes a cathode ray tube for displaying said range and azimuth indications of said aircraft.

6. The radar system defined in claim 1, wherein said range of intervals of time between said range reply signals is higher than the range of intervals of time between said azimuth signal and wherein said display means includes decoder circuit means coupled to said receivers for applying said azimuth signals to said azimuth synchronizing circuit means.

7. A decoder for detecting pulse signals within a predetermined range of pulse spacing, said decoder comprising multivibrator means including a Schmitt trigger circuit having an input circuit and an output circuit, said input circuit and said output circuit having connections to a voltage source, an RC time constant circuit comprising a series-connected resistor and capacitor having connections to said voltage source and to said input circuit of said Schmitt trigger circuit, said input circuit connection being to the junction of said series-connected resistor and capacitor, said capacitor being charged through said resistor from said voltage source within a period of time determined by the time constant of said RC circuit, said charged capacitor operating to maintain said Schmitt trigger circuit in an on-state condiiton; a transistor having base, emitter and collector electrodes, said emitter and collector electrodes of said transistor having connections to said voltage source, said collector electrode connection being to the junction of said series-connected resistor and capacitor, said base electrode of said transistor being adapted to be pulsed from a source of control signals; whereby said transistor becomes conductive when pulsed by said control signals, whereupon said capacitor is discharged and said Schmitt trigger circuit is turned off until said capacitor is recharged during an interval between said pulsed control signals.

8. The invention as set forth in claim 1, including vector signal generating means in each of said transponders operably connected to the input of the associated transmitter for transmitting groups of signals of selected repetition frequency repetitive at selected time intervals whereby to simulate replies for indicating command vectors on said displays in said aircraft.

9. In a radar system for maintaining positional control of aircraft in a flight formation which includes a master aircraft and at least one slave aircraft, a transponder for each aircraft comprising: means for generating azimuth signals, means for generating range signals, transmitter means conneced to the output of said azimuth signal generating means for transmitting azimuth signals to other of said transponders, said transmitter means being also connected to the output of said range signal generating means for transmitting range signals to said other of said transponders, receiving means for deriving signals from said other of said transponders, means for retransmitting said range signals derived from said receiving means; azimuth synchronizing means responsive to said azimuth signals derived from said receiver means for enabling said retransmitting means to retransmit said range signals in preselected azimuth sectors about said master aircraft and display means for each aircraft including said azimuth synchronizing means responsive to said signals derived from said receiver means for providing range and azimuth positional indications of said slave aircraft with respect to said master aircraft.

10. Apparatus as defined in claim 9, wherein said azimuth synchronizing circuit means includes decoder circuit means for accepting said azimuth signals, phase detector means operably connected to variable delay pulse generator means and responsive thereto, said phase detector means and said variable delay pulse generator means each being operably connected to said decoder circuit means and responsive thereto, sawtooth generator means operably connected to said variable delay pulse generator means for controlling the output signal of said variable delay pulse generator means to said phase detector means when said variable delay pulse generator means is triggered by an output signal of said decoder circuit means, and oscillator means responsive to the output signal of said phase detector means for maintaining synchronization of said radar system, said sawtooth generator means being operatively connected to said oscillator means.

11. Apparatus as defined in claim 10, wherein said decoder circuit means includes multivibrator means for triggering said variable delay pulse generator means.

12. Apparatus as defined in claim 11, wherein said multivibrator means includes a Schmitt trigger circuit having an input circuit and an output circuit, said input circuit and said output circuit having connections to a voltage source, an RC time constant circuit comprising a series-connected resistor and capacitor having connections to said voltage source and to said input circuit of said Schmitt trigger circuit, said input circuit connection being to the junction of said series-connected resistor and capacitor, said capacitor being charged through said resistor from said voltage source within a period of time determined by the time constant of said RC circuit, said charged capacitor operating to maintain said Schmitt trigger circuit in an on-state condition; a transistor having base, emitter and collector electrodes, said emitter of said transistor having connections to said voltage source, said collector electrode connection being of the junction of said series-connected resistor and capacitor, said base electrode of said transistor being adapted to be pulsed by said signals from said receiver means; for triggering said transistor into its conductive state whereupon said capacitor is discharged and said Schmitt trigger circuit is turned off until said capacitor is recharged during an interval between said signals from said receiver means.

13. Apparatus as defined in claim 10, wherein said variable delay pulse generator means includes multivibrator means responsive to said sawtooth generator means for delaying the output signal of said variable delay pulse generator.

14. A synchronizing circuit which comprises phase detector means, variable delay pulse generator means, means for applying synchronizing pulses which vary in repetition rate to said phase detector means and to said variable delay pulse generator means, said phase detector means operably connected to said variable delay pulse generator means and responsive to output pulses therefrom, and sawtooth generator means operably connected to said variable pulse generator means for controlling the time of occurrence of output pulses from said variable delay pulse generator means after a synchronizing pulse from said synchronizing pulse applying means, a variable frequency pulse source to be synchronized for repetitively triggering said sawtooth generator, and for applying the output of said phase detector means to said variable frequency pulse source.

15. The synchronizing circuit defined in claim 14, wherein said variable delay pulse generator means includes a Schmitt trigger circuit having an input circuit and an output circuit, an RC time constant circuit comprising a series-connected resistor and capacitor having connections to said voltage source and to said input circuit of said Schmitt trigger circuit, said input circuit connection being to the junction of said series-connected resistor and capacitor, said capacitor being charged through said resistor from said sawtooth voltage from said sawtooth generator within a period of time determined by the time constant of said RC circuit, said charged capacitor operating to maintain said Schmitt trigger circuit in an on-state condition; a transistor having base, emitter and collector electrodes, said collector electrode connection being to the junction of said series-connected resistor and capacitor, said base electrode of said transistor being adapted to be pulsed, said means for applying synchronizing pulses, whereby said transistor becomes conductive when pulsed by said control signals, whereupon said capacitor is discharged and said Schmitt trigger circuit is turned off until said capacitor is recharged by said sawtooth voltage during an interval between said pulsed control signals.

16. A radar system comprising a master unit and a plurality of slave units each disposed in different stations, said stations each including a transponder having a reply signal retransmission path, a directional antenna for cyclically scanning a field of view coupled to said master unit transponder, omnidirectional antennas coupled to said slave unit transponders, means included in said master unit transponder for transmitting a synchronizing signal which varies in accordance with the scanning of said directional antenna, means included in said slave uits responsive to said synchronizing signal for providing slave synchronizing signals phase locked to said antenna scan, gate means in said slave unit transponder disposed in the reply signal path thereof, and means in said slave unit for applying said synchronizing signals to said gate means for enabling the passage of the reply signals in selected portions of said directional antenna scan.

17. The invention as set forth in claim 16, including means in said units responsive to the repetition frequency of reply signals for deriving the range of said slave units with respect to said master unit.

18. The invention as set forth in claim 17, including display means responsive to said synchronizing signals for displaying said range signals in different positions, representing the azimuthal relationship of said slave units with respect to said master unit.

19. The invention as set forth in claim 16, wherein said master unit includes means for transmitting said synchronizing signal and for transmitting interrogating signals during different scan cycles.

20. The invention as set forth in claim 19, wherein said means in said master unit for transmitting said synchronizing signals includes means for generating as said synchronizing signal, a signal which varies in frequency as a function of position of said directional antenna during the scan cycle and means for applying said variable frequency synchronizing signal to said master transponder for transmission.

21. A radar system for controlling the position of a plurality of craft, said system comprising:
(a) a transponder including a receiver and a transmitter in each craft for respectively receiving reply signals and retransmitting said received reply signals,
(b) one of said craft being a master craft and having a signal source for transmitting range interrogations and a variable frequency signal generator for transmitting azimuth signals which have a cyclical variation in frequency corresponding to cyclical scans in azimuth, means for coupling said source and said generator to the transmitter of the master craft transponder for transmission to the other of said plurality of craft,
(c) gate means between said receiver and transmitter in the transponders on said other of said plurality of craft for controlling the transmission of reply signals to said master craft, (d) display means on said other of said plurality of craft comprising
 (1) a synchronizing circuit responsive to said received azimuth signals for providing an output representing different positions in azimuth about said master craft,
 (2) means for applying said output to said gate means for operating said transponders to provide replies in selected ones of said azimuth positions,
 (3) means responsive to said output and said replies for indicating said range and azimuth positions of said other of said plurality of craft with respect to said master craft.

22. The invention as set forth in claim 21, wherein said master craft has a rotary directional antenna coupled to said generator for cyclically varying the frequency thereof, whereby said azimuth signals of different frequency are transmitted in different azimuth positions.

23. The invention as set forth in claim 21, wherein said display means includes a counter for reading range as a function of the repetition frequency of said reply signals.

24. The invention as set forth in claim 21, wherein said synchronizing circuit includes an oscillator and means responsive to the repetition rate of said azimuth signals for phase locking said oscillation.

25. The invention as set forth in claim 24, wherein said locking means includes a recycling counter for counting the cycles of the oscillator output and having capacity to count a number at least equal to the number of said craft.

26. A synchronizing system for locking an oscillator to a frequency which is an integral multiple of the rate at which an input signal cyclically varies in frequency, said synchronizing system comprising means for accepting said input signal, variable delay pulse generator means and phase detector means operably interconnected and each operably connected to outputs of said accepting means and responsive thereto, sawtooth generator means operably connected to said variable delay pulse generator means for controlling the time where an output signal from said variable delay pulse generator means is applied to said phase detector means after said variable delay pulse generator means is triggered by one of the output signals of said decoder circuit means, a counter input coupled to said oscillator means and output coupled to trigger said sawtooth generator means at said rate and means operated by said phase detector output for controlling said oscillator.

27. The invention as set forth in claim 26, wherein said variable delay pulse generator means includes multi-vibrator means responsive to said sawtooth generator means for delaying the output signal of said variable delay pulse generator.

References Cited by the Examiner
UNITED STATES PATENTS

| | | | |
|---|---|---|---|
| 2,419,541 | 4/1947 | DeRosa | 343—13 |
| 2,517,540 | 8/1950 | Busignies | 343—6 |
| 2,529,510 | 11/1950 | Manley | 343—7.5 |
| 2,921,301 | 1/1960 | Cartwright | 343—6 |
| 2,921,302 | 1/1960 | Cartwright | 343—7.5 |
| 3,136,991 | 6/1964 | Foymoreau et al. | 343—6.5 |
| 3,153,232 | 10/1964 | Fletcher et al. | 343—6 |
| 3,176,290 | 3/1965 | Villiers | 343—6.5 |
| 3,204,237 | 8/1965 | Overcash | 343—6.5 |
| 3,223,998 | 12/1965 | Hose | 343—6.5 |

References Cited by the Applicant
UNITED STATES PATENTS

| | | |
|---|---|---|
| 2,444,439 | 7/1948 | Grieg et al. |
| 2,489,221 | 11/1949 | Herbold. |
| 2,538,065 | 1/1951 | Wallace. |
| 2,689,347 | 9/1954 | Lawrance. |
| 2,689,953 | 9/1954 | Litchford et al. |
| 2,733,392 | 1/1956 | Wright. |
| 2,795,780 | 6/1957 | Gross et al. |
| 2,852,773 | 9/1958 | Rogoff et al. |
| 2,947,981 | 8/1960 | Heppe. |
| 3,009,146 | 10/1961 | Luskin. |

RODNEY D. BENNETT, *Acting Primary Examiner.*

CHESTER L. JUSTUS, *Examiner.*

P. M. HINDERSTEIN, D. C. KAUFMAN,
 *Assistant Examiners.*